United States Patent

[11] 3,547,020

[72] Inventor Adolph Eddy Goldfarb
7427 Varna Ave., North Hollywood, Calif. 91605
[21] Appl. No. 701,919
[22] Filed Jan. 31, 1968
[45] Patented Dec. 15, 1970

[54] TOY CAMERA
8 Claims, 8 Drawing Figs.
[52] U.S. Cl. .................................................. 95/13, 95/14
[51] Int. Cl. ...................................................... G03b 17/50
[50] Field of Search .......................................... 95/13, 14

[56] References Cited
UNITED STATES PATENTS
999,238   8/1911   London ....................... 95/13
3,248,216 4/1966   Weigl .......................... 355/3X Primary Examiner—John M. Horan
Assistant Examiner—Robert P. Greiner
Attorneys—Robert M. Ashen and Sokolski & Wohlgemuth ABSTRACT: A compact camera device capable of producing "instant" positive prints on a self-contained basis. The camera includes a lens and shutter structure for projecting a viewed image at a rear exposure location where a film cassette containing a plurality of spring-biased film plates is removably mounted. A viewfinder and a film plate-feeding mechanism are disposed above the exposure location, the feeding mechanism including a slide which serves to displace exposed film plates from the cassette downward into a removable developing tank. In its normal position, an aperture of the slide is aligned with the viewfinder; when the slide has been displaced to its eject position, the viewfinder is blocked to indicate that the shutter should not be operated at such times. The film plates are exposed to the image of a subject through a contact screen closely adjacent to the plate, thereby permitting the generation of tonal values on the instant positive film material of the plate.

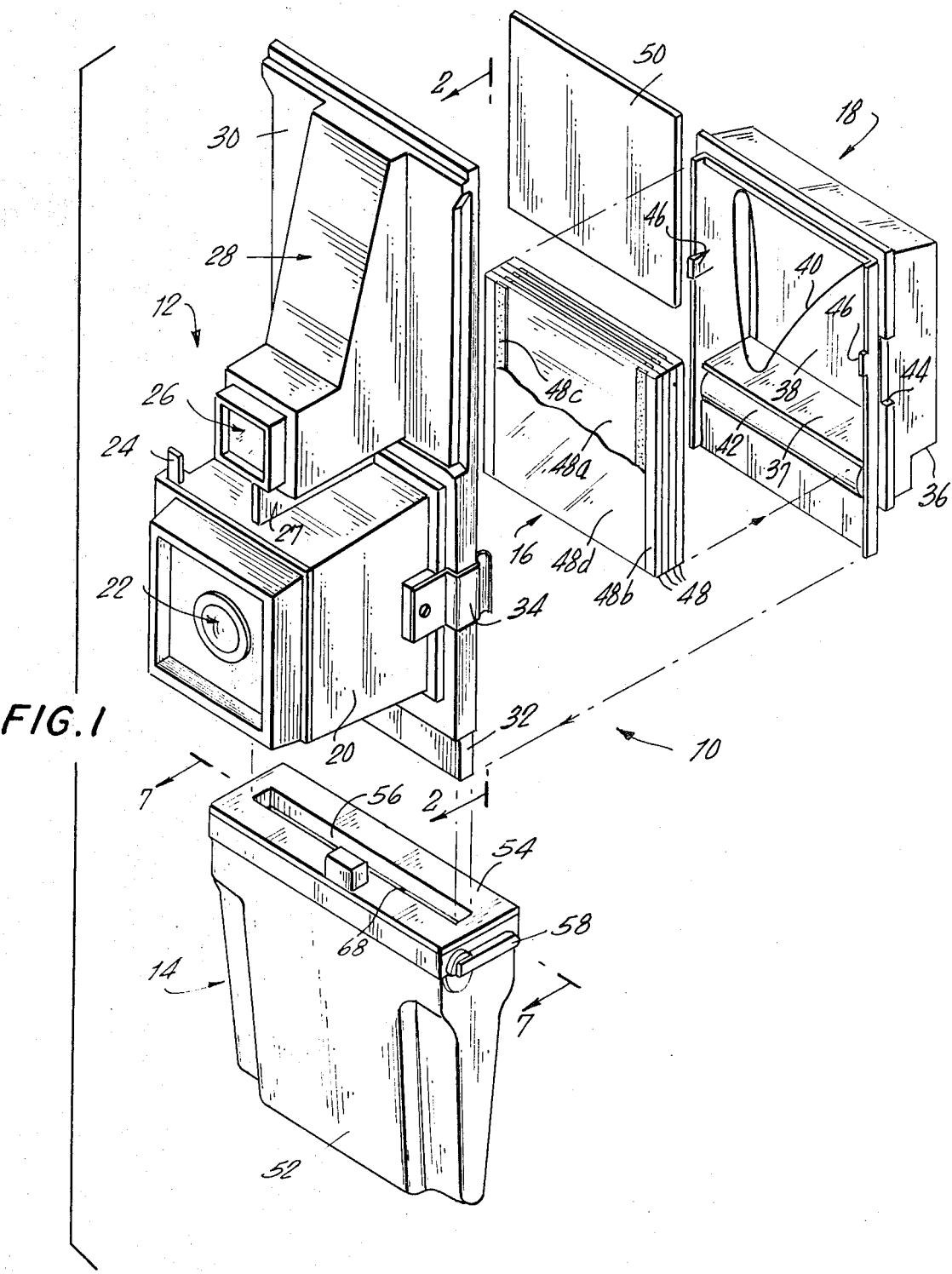

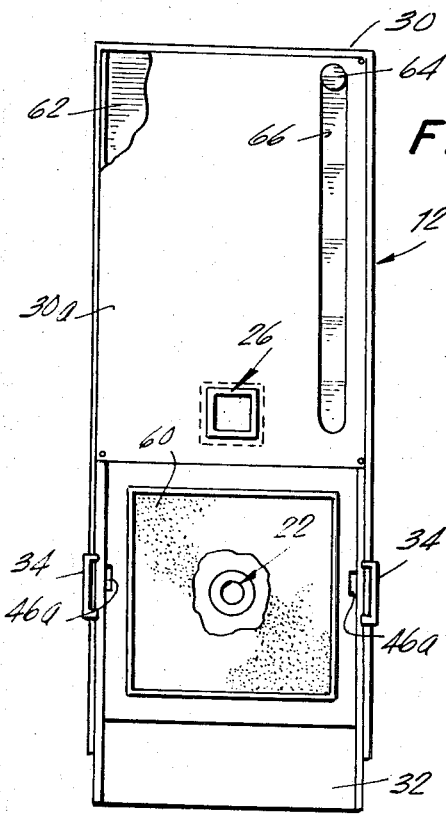
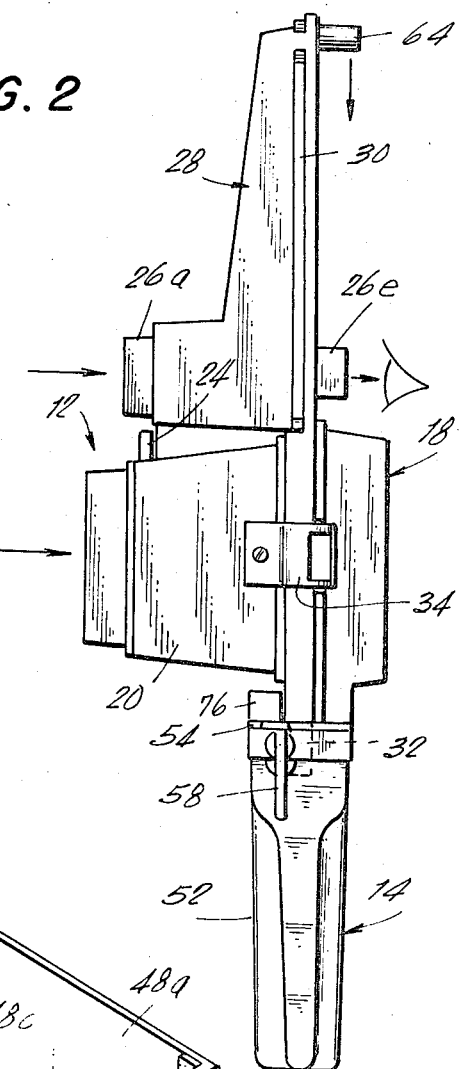
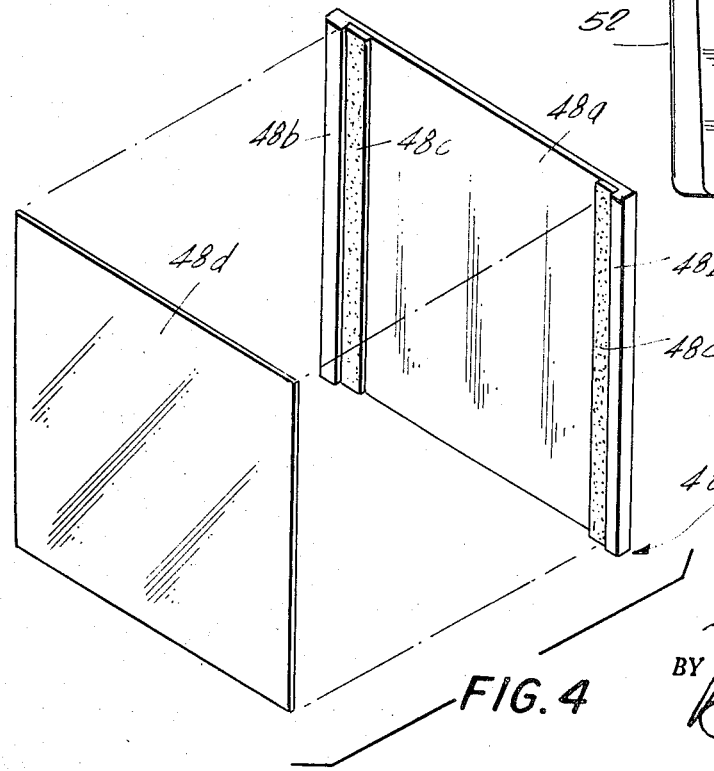

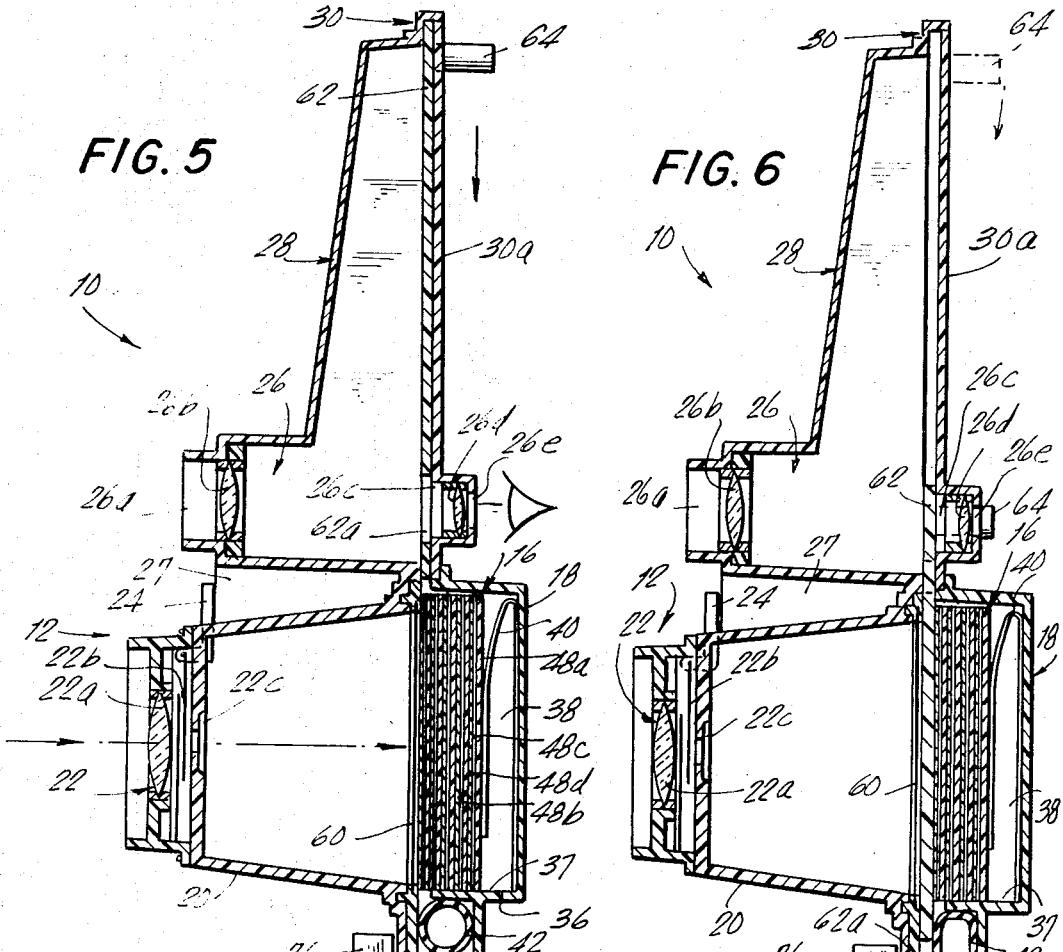
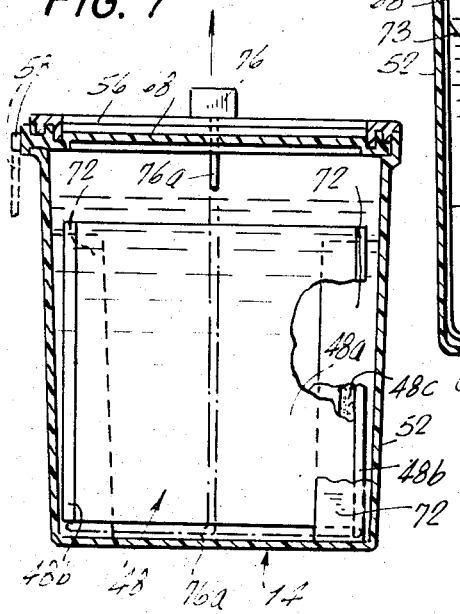

TOY CAMERA

This invention relates to photographic apparatus and more particularly, to a self-contained toy camera adapted for "instantaneous" developing of exposed film.

As contemporary society has advanced, along with its attendant rapidly developing technologies, many new and fascinating concepts have been developed. With such rapid advances, there has been a tendency on the part of various industries to only indirectly utilize some of the technical achievements in one field in another apparently unrelated field. Thus, the application of advances in certain technologies has not always found a corresponding application in the toy industry, for example. But it cannot be doubted that there are many such technologies which could be well received in the toy field if the difficult transition thereto is both contemplated and in fact attempted.

For example, the field of photography is one in which new developments are constantly taking place. New types of cameras and film are always under consideration in the industry. Yet little adaptation of these advances has been made which would permit the practical application of any such advances to toys. While there are many factors which can be cited as possible reasons to discourage such activity, it is possible that the superficial lack of any substantial relation between photography and "toys" is a major reason. Even normally far-sighted toy designers have apparently been unable to visualize an appropriately compact camera design whose cost would be commensurate with other competitive items in the toy field.

Moreover, in the absence of an "instant" camera feature, any cameras heretofore contemplated as usable in the toy field have been too expensive to warrant further pursuit. To the extent that the prior art has considered the use of "instant" or direct positive paper, highly sophisticated photographic systems have been needed to even approach a satisfactory result. This problem has been particularly troublesome when applications to the toy field have been contemplated, since the wide lighting variations under which an instant toy camera would be used would normally call for a correspondingly wide range of lens and shutter speeds. These requirements, as well as the possible need for an exposure meter, have prevented the development of a workable toy camera.

It is therefore an object of the present invention to furnish a toy camera combining the best features of the latest photographic advances as well as the play value and attraction of a toy.

It is another object of this invention to provide a camera which yields to its operator a developed picture without significant delay following exposure.

It is still another object of this invention to provide a camera where the production of developed pictures can occur independent of further exposures or, at the operator's option, in connection with such further exposures.

It is a further object of this invention to obtain tonal values in a print developed from instant positive paper in a toy camera structure.

In one particular illustrative embodiment of this invention, a camera member includes a lens and shutter combination controlling the exposure of film at a rear exposure chamber location and a viewfinder disposed above the exposure chamber. Separate elements adapted to be releasably attached to the camera include a film cassette having a recessed chamber to accommodate several exposable film plates and an underlying developing tank capable of being broken away from the assembled camera structure if desired during development.

It is contemplated that during normal usage, an operator will generally utilize several exposable film plates loaded into the cassette. For example, it may be desirable to package such cassettes with a given number of exposable film plates therein as a commercially available item, such that the cassettes can be totally replaced when all of the contained film plates have been exposed. To this end, a light-blocking or "dummy" film plate is mounted in front of the stack of exposable film plates such that until appropriate indexing arrangements (to be discussed below) remove the dummy from in front of the stack, no erroneous exposures of any of the film plates can occur. At the rear of the cassette chamber in which the stack of film plates is housed is located a spring or other suitable means to urge the individual members of the stack forward to allow for successive replacement at the exposure location of plates which have been exposed by underlying unexposed ones of such plates.

An unexposed film plate containing a film member having its emulsion side facing towards the front of the camera is thereby disposed at the exposure location. Immediately in front of the emulsion side of the film member is a contact screen and this screen may be in direct contact with the emulsion side of the film. The use of this screen permits the desired tonal values to be obtained with direct positive film material and satisfactory exposures will result without the necessity for variable lens and shutter settings and under nearly all subject lighting conditions.

The developing tank, which is attached to the basic camera structure during film advance, includes a hinged entry door extending across the top of the tank, said door providing a light-tight entranceway to the tank through a suitable slot therein. When the tank is attached to the camera housing, the hinged door is forced open, allowing an exit chute in the camera to extend into the tank to provide a direct passageway for exposed film plates from the camera into the tank. Following the exposure of a film plate and its deposit in the developing tank, an operator (e.g., a child) may well want to view, as rapidly as possible, the resultant picture. In such a case, the developing tank can be removed from its attached position to the camera housing, at which time the hinged door will spring back into its position blocking the entranceway to the tank. By the inclusion of a suitable developing liquid in the tank, the enclosed exposed film plate will be suitably treated so as to develop the exposed picture. A hook-shaped finger mechanism on which the exposed film plate rests when its falls into the developing tank can be utilized to remove the developed film plate.

The manner in which the camera structure will generally be operated involves a consideration of the assembled camera unit. Specifically, the film cassette with its stack of film plates covered by a dummy plate is releasably attached to the rear of the camera housing and the developing tank is fixed in position below the housing. With these elements in place, the film plate closest to the front of the cassette (i.e., at the exposure location of the camera housing) is directly beneath a movable slide member housed within the upper frame of the camera structure, just behind the viewfinder. Since a newly attached cassette has as its first member a dummy film plate, the first step for the operator is to remove such a dummy plate. This is done by causing the slide to move downward by means of a knob projecting through the rear frame of the camera, which knob is attached to the slide and which rides in a guide slot. Moving such knob downward in its slot serves to index the dummy plate out of the camera and either into the developing tank (if attached at this time) or to a suitable discard location. The slide is equipped with an aperture which, under normal conditions, is aligned with the viewfinder and particularly with an eyepiece element thereof. When the slide is in its "down" position, for example, just following the downward displacement of the dummy plate, the slide aperture is no longer in line with the eyepiece and accordingly the operator cannot view any subject. This is an indication to the operator to relocate the slide in its upper position at which time the slide aperture will once again be aligned with the eyepiece, and viewing prior to exposure can take place. When such exposure has occurred (through the contact screen), the development is initiated by the downward displacement of the slide, thereby ejecting the exposed film plate (which was placed in position by the spring biasing at the rear cassette) into the underlying developing tank. Assuming that the operator desires to be break such tank away from the overall camera structure, this is done following the insertion therein of an exposed film plate. Following a suitable development time period, the plate is removed and the resultant picture is immediately available.

It is therefore a feature of an embodiment of this invention that a toy camera is provided with a film cassette having a plurality of film plates biased towards one side thereof for continuous film loading as exposed film plates are removed.

It is a further feature of an embodiment of this invention that a contact screen having a configuration of minute dots thereon is employed at a camera exposure location to generate subject tonal values on direct positive print material at such a location.

It is another feature of an embodiment of this invention that a combined sighting and film ejection and loading mechanism is utilized to permit the sighting and "shooting" of a subject only when the ejection of an exposed film plate is not occurring and therefore only when a fresh unexposed film plate is in proper place for exposure.

It is still another feature of an embodiment of this invention that a camera is provided with a releasably mounted developing tank to receive therein exposed film plates following their exposure such that the development occurs within the tank, either attached to the camera or separated therefrom.

A still further feature of an embodiment of this invention includes means for preventing light from entering into a developing tank or into a film cassette during film transport.

Still another feature of an embodiment of this invention is facilities for retrieving a developed film plate from within a developing tank following development.

The above brief description, as well as further objects, features and advantages of the present invention, will be more fully appreciated by reference to the following detailed description of a presently preferred, but nonetheless illustrative embodiment demonstrating objects and features of the invention, when taken in conjunction with the accompanying drawing, wherein:

FIG. 1 is an exploded perspective view of a camera in accordance with the present invention, partially broken away for clarity;

FIG. 2 is a rear view of the camera housing showing the lens, shutter and viewfinder, partially broken away for clarity;

FIG. 3 is a side view of the a camera in assembled form;

FIG. 4 is an enlarged exploded view of a film plate member usable with the invention;

FIG. 5 is an enlarged side sectional view of the assembled form of the camera of the present invention, illustrating the slide in its upper position with the film cassette and developing tank in their initial attached positions;

FIG. 6 is an enlarged side sectional view of the camera of the present invention, with the slide having been moved to its lower position whereby a film plate has been ejected into the developing tank;

FIG. 7 is a front sectional view of the developing tank separated from the camera and showing an inserted film plate and the removing finger in phantom; and FIG. 8 is a fragmentary end sectional view of the upper portion of the developing tank showing the same after having been separated from the camera, with the hinged door thereof closed.

The camera of the present invention is shown in exploded form in the perspective view of FIG. 1. An understanding of the manner in which the camera operates in its assembled form can be gathered from a reference to FIG. 3, which shows the assembled camera structure in profile, and FIGS. 5 and 6 which are operational sectional views indicating different stages of the operation of the camera with respect to the film plates. Referring initially to the exploded view of FIG. 1, the overall camera arrangement is identified by the numeral 10 and includes a basic camera and viewing housing 12, a developing tank 14 and a stack 16 of film plates 48 adapted to be loaded within a cassette 18. Considering the basic member 12 initially, such member includes an exposure chamber 20 which has at its front end lens and shutter structure 22, with the shutter being controlled by shutter-actuating button 24. The front portion of viewfinder 26 is mounted above the exposure chamber 20; illustratively, the overall viewfinder housing 28 can be supportingly attached to the exposure chamber 20 by means of a web or flange 27 of suitable rigid material. The viewfinder housing 28 is in turn affixed to the upright frame or base 30 of the basic camera member 12. Although this structure will be discussed in greater detail below, it can be mentioned at this time that, as seen in FIG. 2, the rear of the frame 30 encases a vertically movable slide 62 whose movement is controlled by the position of knob 64 which rides within slot 66. As illustrated in FIG. 2, for example, the slide 62 can be seen behind the rear frame surface 30a; in its upper position as seen in FIG. 2, the camera operator will have an unobstructed view through the viewfinder objective 26.

The film cassette 18, which is adapted to be attached to the rear of the camera member 12 by means of the mating of flexible brackets 34 into cutouts 44 on the side frames of the cassette 18, includes a chamber 38 for receiving therein a stack 16 of film plates 48. (As seen in the rear view of FIG. 2, the cassette 18 is also held in place when it is attached to the camera member 12 by virtue of the insertion of projections 46 on cassette 18 into recessed slots 46a.) The stack of film plates 48, upon loading into the chamber 38 whereby it rests on the surface of platform 37, is biased toward the front of the cassette by means of spring 40 or other suitable biasing means. As will be more fully explained below in connection with FIGS. 5 and 6, compressible tube 42 housed in an appropriately sized slot just below platform 37 prevents the penetration into the loaded cassette 18 of undesirable light when the film plates 48 are downwardly ejected.

The film plates 48 are stacked together in a stack 16. At the time of initially loading the stack 16 into the cassette 18, undesirable exposure of the topmost film plate is avoided by the placement thereover of a dummy plate 50 which illustratively can comprise a suitable opaque material. As view in FIG. 1, the dummy plate 50 is shown exploded upward from the stack 16, thereby illustrating the surface of the first film plate 48. Considering such a plate, shown with the film element partially broken away in FIG. 1 and exploded away in FIG. 4, an individual film plate 48 comprises a rear surface 48a of relatively stiff material (e.g., plastic, cardboard, metal, etc.), with the film member 48d being retained within ridges or channels 48b by virtue of adhesive strips 48c affixed to the surface 48a. In its assembled form, the uppermost surface of the film 48d illustratively comprises instant or direct positive paper and as such is adapted to be acted upon by suitable developing liquid in the developing tank 14 into which an exposed film plate 48 is dropped.

The developing tank 14, which is illustrated in FIG. 1 as exploded away from projecting chute 32 of the camera member 12, includes a basic tank frame 52 and an upper surface member 54 with an elongated slot 56 therein to permit the joining of the developing tank 14 onto camera member 12 by the insertion of the chute 32 into the slotted entranceway 56. As illustrated in FIGS. 5—8, just below the surface os of slot 56 is a door or entrance gate 68 the position of which can be controlled by the external handle or lever 58. The position of the door 68 is also controllable in response to the positioning within tank 14 of chute 32 when the tank 14 is attached to the camera member 12. Thus, when the attachment takes place, the insertion of chute 32 into slot 56 forces gate 68 down from the horizontal position in FIG. 8 and into the open position illustrated in FIGS. 5 and 6. The gate, which can illustratively be spring loaded so that it will tend to return to the horizontal position illustrated in FIG. 8, is connected by means of lengthwise pin or rod 70 to the handle 58. The internal portion of the tank 14 includes substantially parallel wall members 72 each of which includes upwardly projecting guide channel members 73 which direct any film plate dropped into the tank into the appropriate retaining region defined by the wall members 72. The developing liquid 74 can be included either in the developing region defined by the wall members 72, or throughout the developing tank 14 independent of the wall members 72.

In order to assemble the various components of the camera 10 in one of the illustrative assembled modes of operation, these components interrelate as previously described and as generally shown in the side view of FIG. 3. That is, the stack 16 of film plates 48, with the first-to-be-exposed plate covered by dummy plate 50, is inserted into chamber 38 of cassette 18 as illustrated by the assembling arrow line in FIG. 1. Such insertion of the stack 16 into the chamber 38 forces spring 40 back towards the rear wall of the cassette 18 to the forward-biased position illustrated in the enlarged sectional views of FIGS. 5 and 6. As a result of such positioning, the spring 40 urges successive ones of the film plates 48 towards the exposure location at the rear of camera exposure chamber 20, which location is directly to the rear of exposure screen 60. Considering FIGS. 1—3 together, the cassette 18 is retained as part of the overall assembled camera structure 10 by means of the resilient brackets 34 which grasp the cassette at its surrounding frame 36 through the recessed cutout channels 44 thereof; at the same time, projections 46 are inserted into slots 46a on the camera member 12 to prevent the cassette 18 from moving in the vertical directions. When the cassette 18 has been so attached to the camera member 12, it occupies a position with relation to the camera member 12 substantially as shown in FIG. 5 which illustrates, in cross-sectional form, the biasing of several film plates 48 of the stack 16 towards the exposure location to the rear of screen 60. The illustration of FIG. 5 represents a time subsequent to the ejection of the dummy plate 50 (not shown in FIG. 5, but see FIG. 1) whose removal is achieved in a manner quite similar to that in which each successive exposed film plate 48 is removed as described below.

In view of the fact that the stack 16 of film plates 48 is covered in its initially installed form by dummy plate 50, it may well be desirable to eject dummy plate 50 prior to the attachment, as part of the assembled camera 10, of the developing tank 14. While there would be no significantly adverse consequences from attaching the developing tank 14 prior to the ejection of the dummy plate 50, it will generally be found preferable to eject the dummy plate 50 first. Accordingly, the ejection mechanism disposed above the exposure chamber 20 and the installed film cassette 18 will now be described.

This mechanism, which is found to the rear of viewfinder housing 28, includes the encased slide 62 shown by virtue of the upper broken away portion in FIG. 2. As seen in FIG. 5, for example, the slide 62 is in its upper position, with position-controlling knob or button 64 seated against the upper edge of slot 66 illustrated in FIG. 2. The slide 62 includes an aperture 62a which, when the slide 62 is in this upper position, is aligned with the inner aperture 26c of the viewfinder 26. On the basis of such alignment, there is an unobstructed optical path from a subject (not shown) about to be photographed to the operator's eye through objective 26a, lens 26b, slide aperture 62a, viewfinder inner aperture 26c, lens 26d and viewfinder outer aperture or eyepiece 26e. As is apparent from an inspection of FIG. 5, the slide 62 is coplanar with the first member of the stack 16—that is, when the cassette 18 is initially loaded onto the camera member 12, it is the dummy plate 50 (not shown in FIG. 5) which is directly beneath the slide 62. Accordingly, when the slide 62 is lowered by an operator's depressing knob 64 as indicated by the downwardly directed arrow in FIG. 5, the knob 64 rides downward within slot 66 and slide 62 forces out the dummy plate 50 through chute 32. As the dummy plate 50 is ejected out of the camera member 12 through the chute 32, the tube 42 (which may be of suitable compressible material, such as vinyl) is compressed as shown in FIG. 6; such compression forms a light-tight obstruction whereby no light is permitted to pass upwards through chute 32 and into the unexposed film plates 48 inside the cassette 18.

Following the ejection of the dummy plate, the slide 62 is in the downward position substantially as illustrated in FIG. 6. At such time, viewfinder 26 is optically blocked by virtue of the obstruction of the optical path from viewfinder objective 26a to viewfinder eyepiece 26e due to the interposition therebetween of the uppermost portion of slide 62. Accordingly, if an operator were to attempt to sight a subject at this time, he would be unable to do so—this acts as an indication that the slide 62 must be returned to its upper position whereby the viewfinder 26 once again becomes unobstructed by virtue of the presence of slide aperture 62a in the viewfinder optical path (see FIG. 5). By reference to FIG. 6, it can be seen that this type of indication (i.e., that no picture should be taken) should be given to an operator when slide 62 is in its downward position, since the film element 48d (FIG. 4) of the frontmost film plate 48 is blocked at such time by at least a substantial portion of slide 62. Accordingly, any subject exposed through the lens and shutter combination 22 at such times would be partially or completely blocked from the film plate 48 and no photograph would result therefrom. The blockage of the viewfinder optical path previously discussed is therefore a signal or indicator to an operator that slide 62 must be raised to the position illustrated in FIG. 5 before any exposure is made.

While it is not necessary to attach developing tank 14 to camera member 12 prior to actual exposure of any of film plates 48, it is preferable that this be the operating sequence since failure to do so will create the possibility of ejecting an exposed film plate 48 through chute 32 and into a available light, thereby ruining the exposure. While those skilled in the art will recognize that it possible to practice the invention by attaching the developing tank 14 subsequent to the exposure but prior to ejection of the exposed film plate and then breaking away the tank following each ejection, the following description will refer to the mode of operation whereby the tank 14 is attached to camera member 12 prior to any exposure and is only broken away therefrom following the ejection of the exposed film plate. (It will also be recognized by those skilled in the art that developing tank 14 can be arranged so as to afford sufficient space for containing several of the exposed film plates 48 at the same time, for example when exposures thereof are made in rapid succession —assuming that the time period during which an exposed film plate 48 is immersed in developing liquid 74 is not especially critical, such a multiple developing mode is both satisfactory and under certain conditions, quite desirable).

A complete understanding of the operation of the camera of the invention herein can be gotten by reference to FIGS. 5 and 6 in connection with the following description of a typical operational cycle including the steps of sighting, exposure, film plate ejection and developing. As explained, it will be assumed that dummy plate 50 has already been ejected from the camera member 12 through chute 32, thereby placing an unexposed film plate 48 at the exposure location at the rear of exposure chamber 20 directly behind screen 60. (In fact, the emulsion side of film member 48d may be in contact with screen 60). As has also previously been noted, the biasing action of spring 40 within cassette 18 causes successive ones of film plates 48 in the stack 16 to be moved into place at such exposure location. Reference is made to FIG. 5, with developing tank 14 having previously been attached to camera member 12 so that chute 32 has forced open developing tank door 68 as noted previously. The operator will initially sight a subject prior to exposure. This is done in the usual fashion and while the viewfinder 26 is illustrated as having two fixed-position lenses 26b and 26d, it will be apparent to those skilled in the art that other suitable optical systems can be utilized to form a "deluxe" model, for example, coupling the viewfinder 26 with the main lens 22a, Other suitable variable focusing arrangements can be utilized, but this may substantially increase the cost of the camera. Accordingly, sighting of a subject which the operator wishes to photograph is done by means of the viewfinder 26 with the slide 62 in its upper position as illustrated in FIG. 5. This position can be denominated as the "go-ahead" position whereby the operator is, in effect, being told that it is permissible snap the shutter. Thus, at such times, slide aperture 62a is aligned with the optical path through viewfinder 26. When this alignment has been achieved and the subject is appropriately sign sighted, the operator can proceed with the opening of the shutter.

The shutter and lens combination 22 shown in FIGS. 5 and 6 is generally conventional and includes lens 22a, shutter blade 22b and a light-admitting aperture 22c opening into exposure chamber 20. The shutter blade 22b is controlled in response to the operation of button 24. In its normal position, shutter blade 22b covers opening 22c and thereby prevents the passage into exposure chamber 20 (and back to an unexposed film plate 48) of any light. When the button 24 is depressed, shutter blade 22d is me momentarily removed from its blocking position in front of aperture 22c and light rays, focused by lens 22a defining the sighted subject, fall upon the film member 48d of the frontmost film plate 48. The exposure takes place through screen 60 which can be advantageously be designed to effect appropriate tonal values in the resultant direct positive print as explained in copending Pat. application Ser. No. 701,918, filed concurrently herewith. (As explained in the copending application, the presence of contact screen 60 directly in front of film plate 48 creates, because of its dot configuration, an exposure latitude far greater than the prior art. The latitude permits direct positive pring paper to be utilized and yet still obtain satisfactory tonal values without requiring variable shutter speed and lens arrangements). Shutter blade 22b then rapidly returns to its rest position, blocking aperture 22c in a well-known manner, such that the appropriate exposure time has been given for the instant positive print paper of film member 48d to be suitably exposed.

The operator then proceeds to eject the exposed film plate 48 into developing tank 14 and in so doing, follows a transition which is illustrated between FIG. 5 and FIG. 6. That is, referring to FIG. 5, the operator presses button 64 down and by virtue of its riding within slot 66, button 64 causes attached slide 62 to move downwards as indicated by the downwardly directed arrow in FIG. 5. Slide 62, which is located just in front of rear frame surface 30a of camera member 12, moves down and accordingly pushes the underlying and just exposed frontmost film plate 48 down past compressible light-retaining tube 42. As seen in FIG. 6, tube 42 is in its compressed form by virtue of the pressure thereagainst of slide 62; however, prior to the time illustrated in FIG. 6, tube would have been compressed by the passage of the exposed film plate 48 from the cassette 18 into developing tank 14. In either situation, it can be seen from the position of tube 42 in FIG. 6 that the relationship between the tube and the element causing the compression of the tube (i.e., either an exposed film plate 48 or slide 62) results in the placement of a light-tight seal between the bottom of chute 32 and the remaining unexposed film plates 48 within cassette 18. Accordingly, should the developing tank 14 be separated from the remainder of the camera, with slides 62 either in its upper of or lower position, no light would be permitted to enter into said cassette 18 to expose film plates 48 remaining therein.

Thus, slide 62 forces underlying film plate 48 downward past compressible tube 42 and thence into chute 32. The exposed film plate is thereby ejected into developing tank 14 and, as illustrated in FIGS. 6 falls into tank 14 between walls 72 thereof where it is acted upon by developing liquid 74. The developing process can continue with the developing tank 14 attached as illustrated in FIG. 6 and exposed film plate 48 held within walls 72 of tank 14. As previously adverted to, walls can be spaced further apart than illustrated in FIGS. 5 and 6, thereby permitting additional exposed film plates 48 to be held therein for common development.

In order to permit greater flexibility and allow for fuller exposure of plate 48 to developing liquid 74 e.g. by agitation), this invention contemplates the breaking away of developing tank 14 from camera member 12 (with cassette 18 attached) in a manner so as to preserve the integrity of tank 14 in its separated condition. That is, when the tank 14 is broken away, light should be prevented from entering into the tank and developing liquid 74 should not be permitted to escape. Such conditions are achieved by removing tank 14 downwardly from camera member 12 so that chute 32 is withdrawal from slot 56 in upper surface 54 of rank 14. As this withdrawal takes place, suitably spring-loaded door or gate 68 of tank 14 rotates counterclockwise around pin or rod 70 FIGS. 5 and 6) and thereby swings shut. As viewed in FIG. 8, door 68 blocks the entranceway to tank 14 through slot 56 and accordingly, the tank 14 is transfomed into an integral and light-tight unit.

The view of FIG. 7 illustrates the manner in which an ejected exposed film plate 48 can be retained within walls 72 of tank 14 during development. In view of the closure of door 68 as previously described, tank 14 can be rotated and turned into several different orientations to permit developing liquid 74 to have complete access to all of the surface of film member 48b of film plate 48. It is noted from FIG. 6 that an exposed film plate, when ejected into developing tank 14, rests on the lower transverse portion of claw or finger 76a. Film plate 48 remains on top of finger 76a until development by developing liquid 74 has been completed. At that time, as seen in FIG. 7 by the phantom showings of handle 58 and knob 76, the developed film plate 48 is removed. Specifically, handle 58 is depressed downward (clockwise from the position shown in FIG. 1), thereby causing door 68 to swing clockwise from the position illustrated in FIG. 8 towards that illustrated in FIGS. 5 and 6. When door 68 has been swung open to a point sufficient to permit a film plate or plates to pass upward from between walls 72 and into slot 56, the operator grasps knob 76 and lifts the film remove removal mechanism upward as indicated by the upwardly directed arrow in FIG. 7. The developed film plate 48 is thereby withdrawn through slot 56 of tank 14 by virtue of its resting upon finger element 76a as illustrated in FIG. 6. Once the developed plate is removed from tank 14, suitable washing processing can take place e.g. in water), and following drying, the resultant positive print is ready for viewing and whatever display is desired.

Backing member 48a of film plate 48, when made of suitably rigid material such as appropriate plastic, provides an attractive frame (including channels 48b ) for the resultant photograph. As is well known, the photograph can be preserved for some time by the application to its surface of appropriate preservatives.

It is to be understood that a latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. A toy camera for producing prints having the tonal values of a subject on direct positive paper, comprising a housing having an exposure chamber, controlled aperture means for selectively admitting light from said subject into said exposure chamber, a cassette adapted to be mounted on said housing and containing at least one film member, a contact screen having a dot configuration and being disposed adjacent to said one of said film members in the path of said light between said controlled aperture means and said one of said film members, said contact screen means and one of said film members defining an exposure location said exposure chamber, means for causing said controlled aperture means to initiate an exposure of said one of said film members at said exposure location, tank means adapted to communicate with said exposure location to receive exposed ones of said film members, a viewer having an objective member and an eyepiece member for completing a sighting path to said subject, and a transport means for transferring said exposed ones of said film members from said exposure location to said tank means, including a frame having a guide slot, a mounting for said eyepiece member and an aperture disposed in said sighting path, a slide member having a projection adapted to ride in said guide slot, said slide member being movable from a first sighting position s adjacent to said exposure location to a second eject position at said exposure location whereby said exposed ones of said film members are transferred to said tank means.

2. A toy camera as defined in claim 1 wherein said cassette includes a chamber for receiving said at least one film member, resilient means for urging said film member toward said exposure location when said cassette has been mounted on said housing and compressible sealing means including a vinyl tube and wherein said cassette further includes a recess for housing said tube in its normal and compressed states, for precluding the entry of light into said cassette and said exposure location during the operation of said transport means.

3. A toy camera as defined in claim 1 wherein said housing includes a projecting lip and said cassette includes a projecting wall, said lip and said wall defining a passageway communicating with said tank means when said cassette is mounted on said housing, and wherein said tank means includes a slotted entranceway to permit said tank means to be removably attached to said passageway and a pivotable gate movable between an open position when said tank means is communicating with said passageway and a closed position when said tank means is detached from said passageway.

4. A toy camera as d defined in claim 1 wherein each of said film members includes a light sensitive element of direct positive material, a substantially rigid backing element, at least one retaining ridge on said backing element to permit the mounting thereon of said light sensitive element and means for affixing said light sensitive element to said backing element.

5. A toy camera as defined in claim 4 wherein said affixing means includes at least one adhesive strip adjacent to said ridge.

6. A toy camera as defined in claim 1 wherein said slide member includes an opening alignable with said aperture of said transport means when said slide member is in said first sighting position, whereby said slide member blocks said sighting path when said slide member is in said second eject position.

7. A toy camera as defined in claim 1 wherein said slide member is disposed substantially coplanar with said one of said film members at said exposure location, said slide member displacing said one of said film members from said exposure location into said tank means when said slide member is moved from said first sighting position to said second eject position.

8. A toy camera as defined in claim 3 wherein said tank means further includes a spring for biasing said gate towards said closed position when said tank means is detached from said passageway, said gate being forced to said open position against the urging of said spring by contact with said passageway, substantially upright internal walls defining a development chamber and a hooked finger having a handle, a downwardly projecting shaft and a transverse portion extending from said shaft and underlying exposed ones of said film members in said development chamber, whereby said film members can be removed from said tank means when development thereof has been completed.